(No Model.) 9 Sheets—Sheet 1.
J. P. LEE.
STRAIGHT PULL BOLT GUN.
No. 506,320. Patented Oct. 10, 1893.
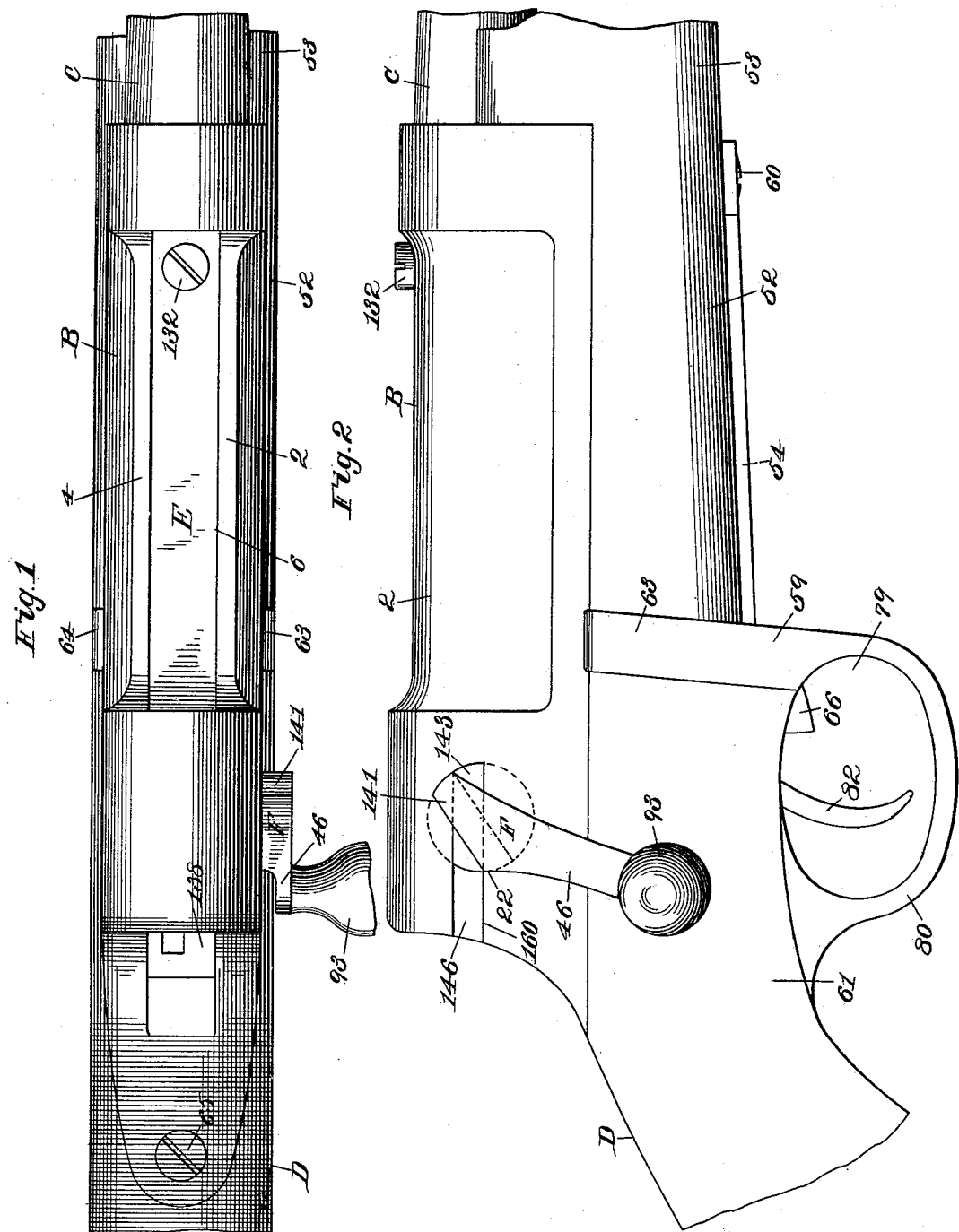
Witnesses:
Henry L. Reckard.
H. Mallner
Inventor:
James P. Lee,
By his Attorney,
F. H. Richards

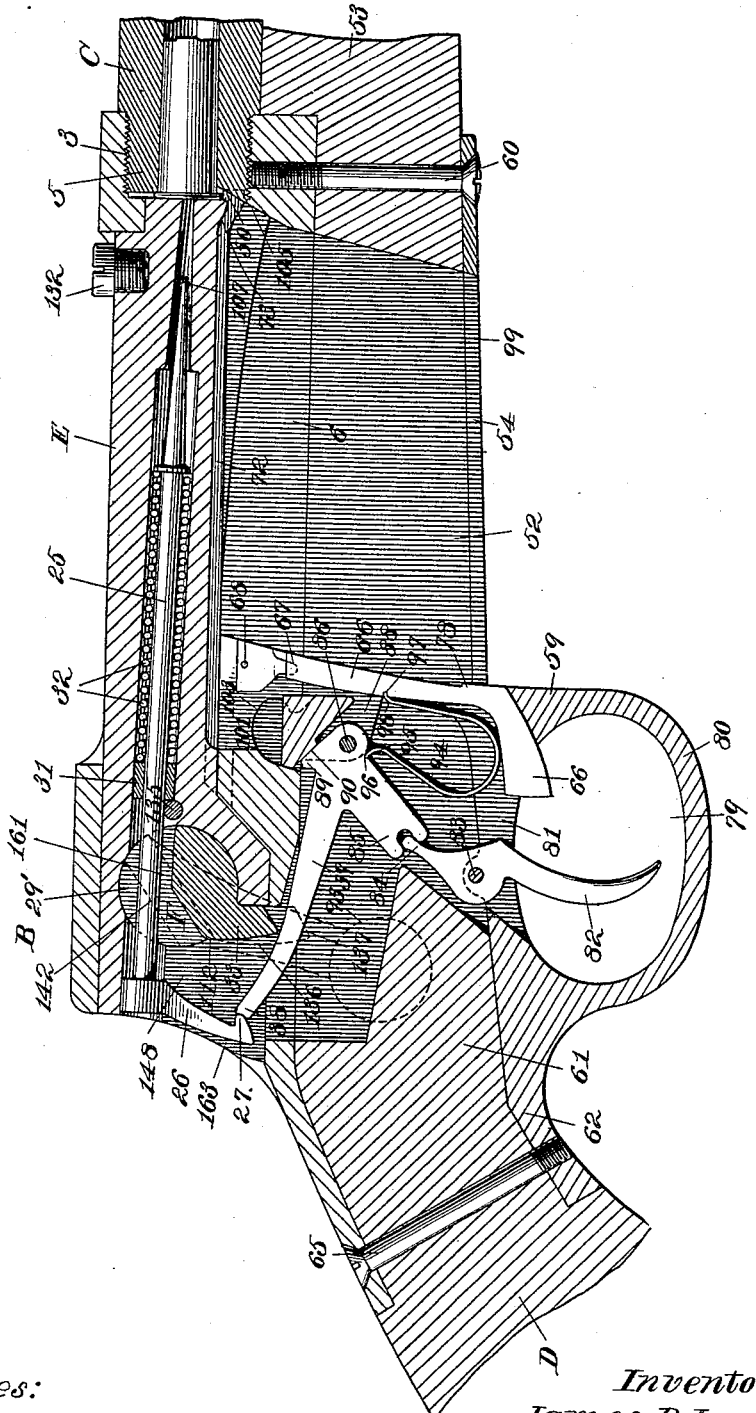

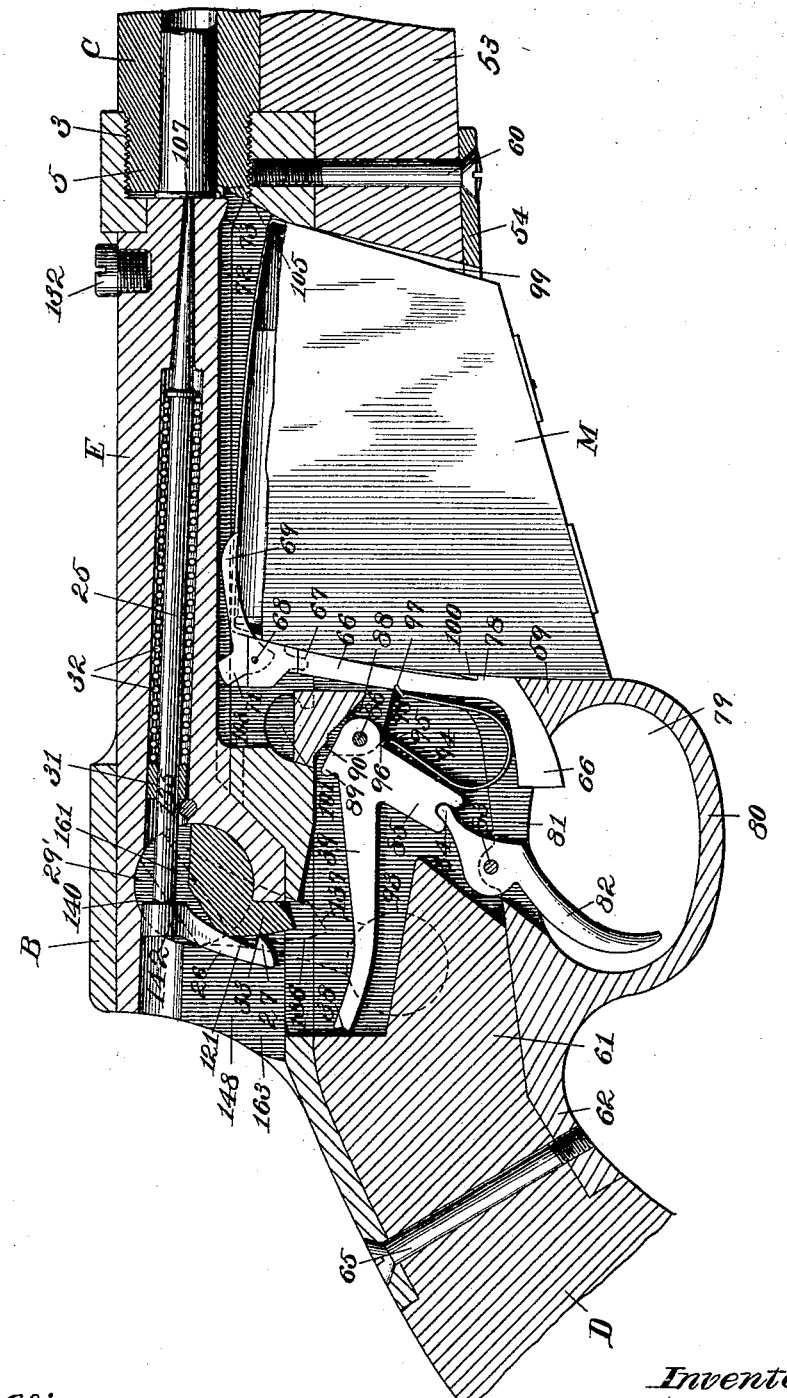

(No Model.)　　　　　　　　　　　　　　　9 Sheets—Sheet 4.
J. P. LEE.
STRAIGHT PULL BOLT GUN.
No. 506,320.　　　　　　　　　Patented Oct. 10, 1893.
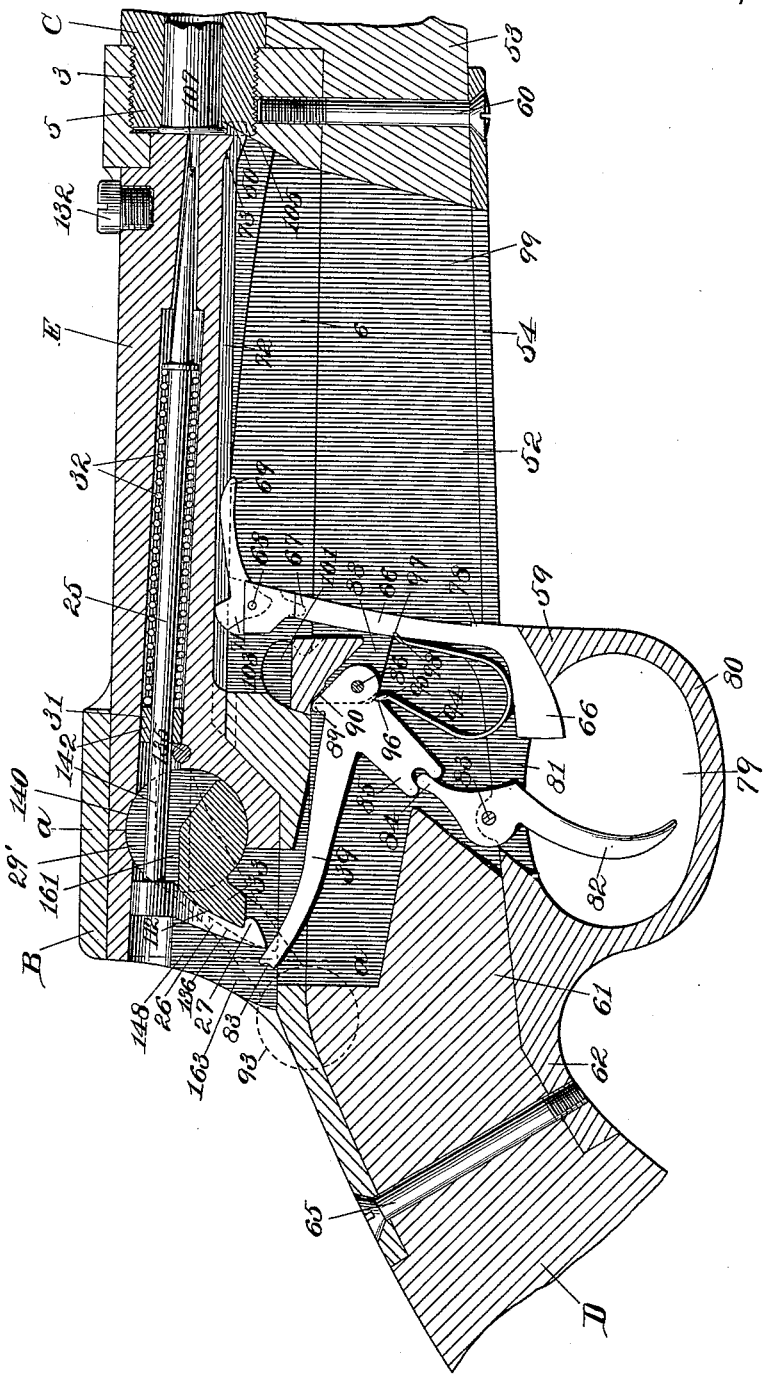
Witnesses:
Henry L. Reckard.
H. Mallner.
Inventor:
James P. Lee,
By his Attorney,
F. H. Richards.

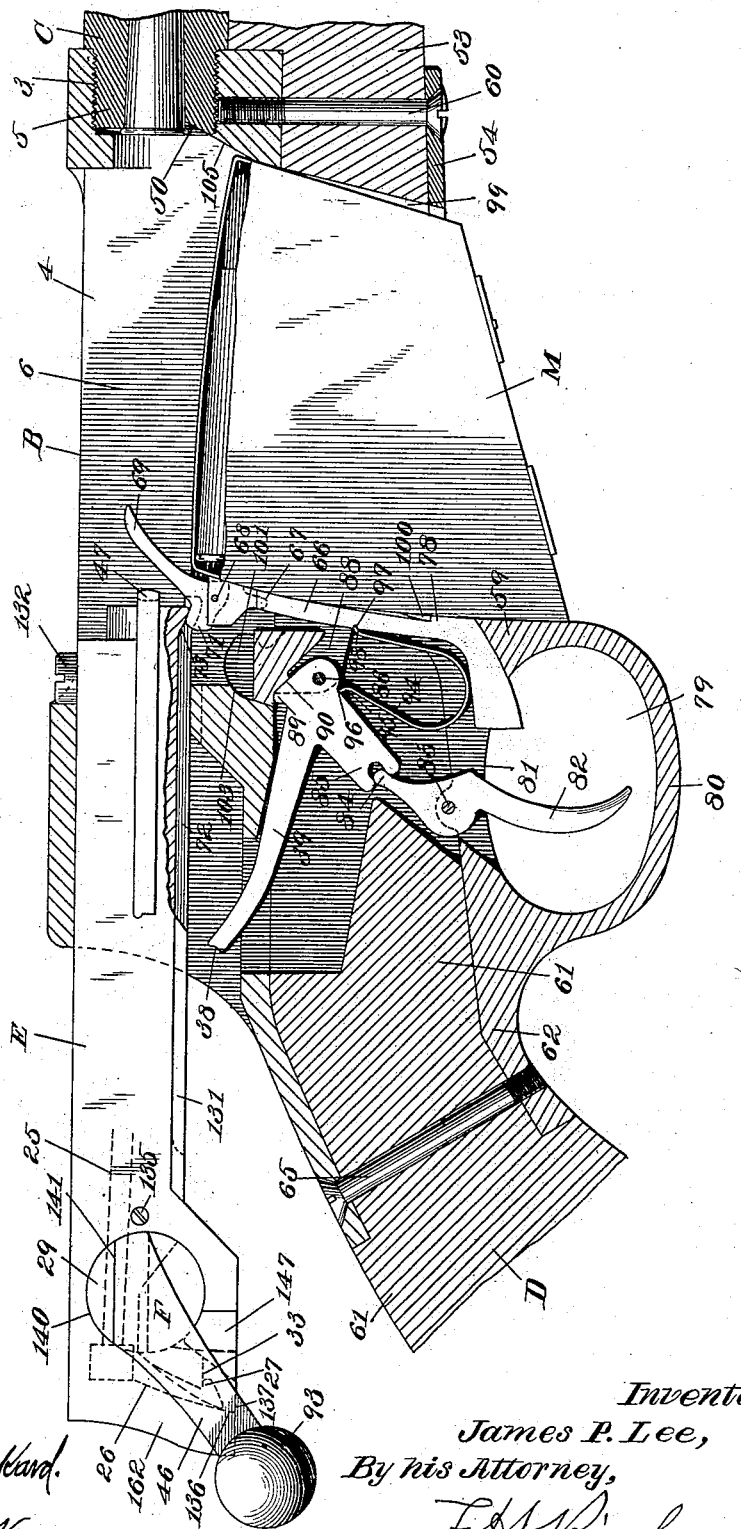

(No Model.) 9 Sheets—Sheet 6.
J. P. LEE.
STRAIGHT PULL BOLT GUN.
No. 506,320. Patented Oct. 10, 1893.
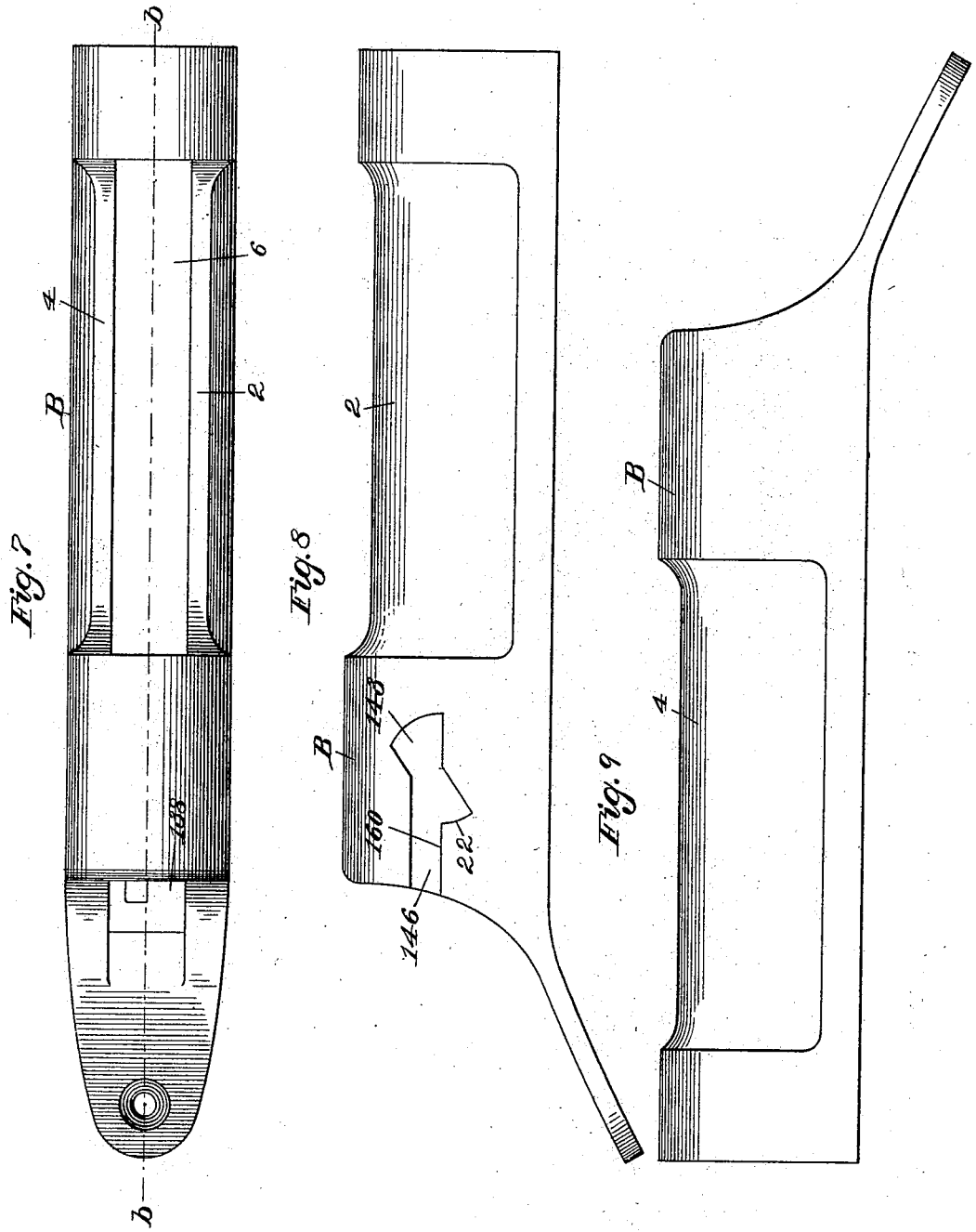
Witnesses:
Henry L. Reckard.
H. Maltur.
Inventor:
James P. Lee,
By his Attorney,
F. A. Richards (No Model.) 9 Sheets—Sheet 7.
J. P. LEE.
STRAIGHT PULL BOLT GUN.
No. 506,320. Patented Oct. 10, 1893.
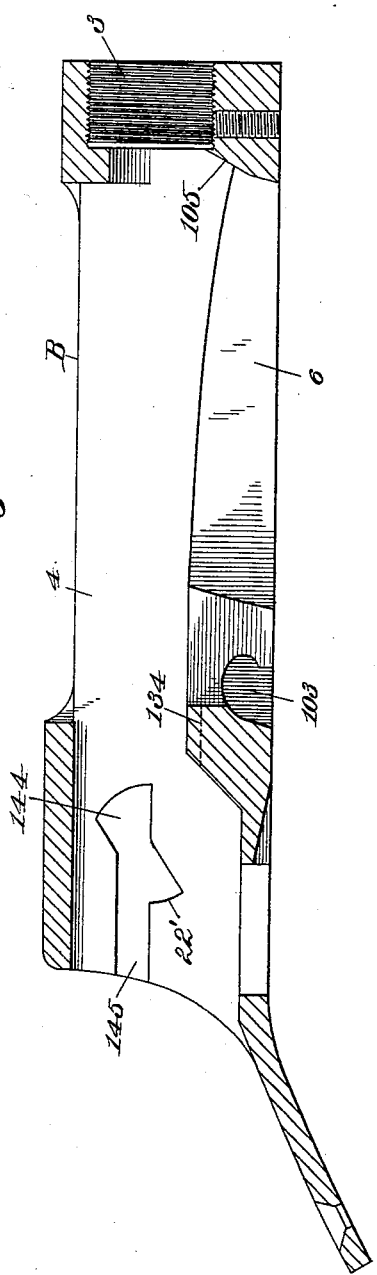
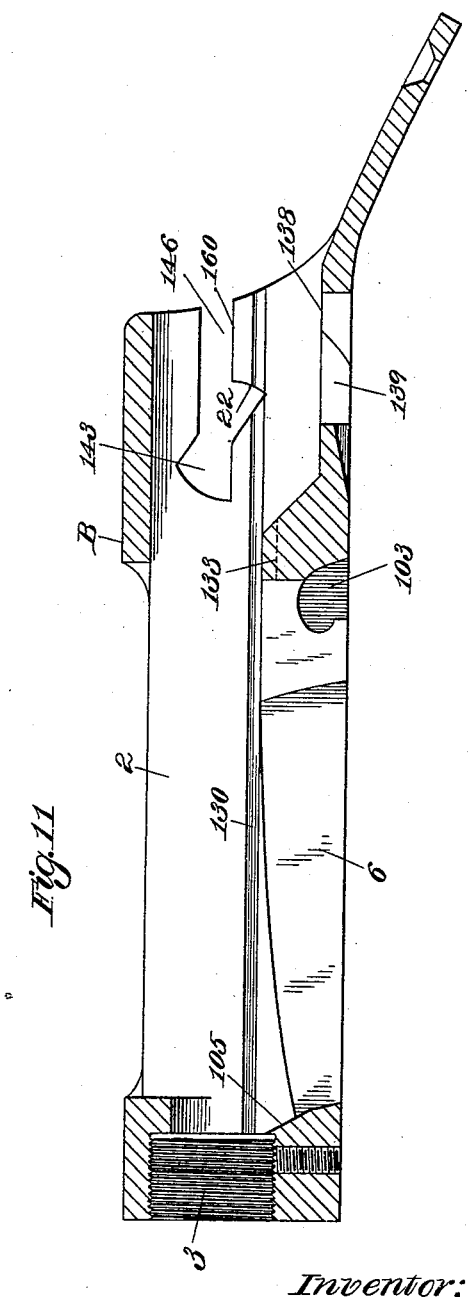
Witnesses:
Henry L. Reckard.
H. Mallner.
Inventor:
James P. Lee,
By his Attorney,
F. H. Richards (No Model.) 9 Sheets—Sheet 8.
J. P. LEE.
STRAIGHT PULL BOLT GUN.
No. 506,320. Patented Oct. 10, 1893.
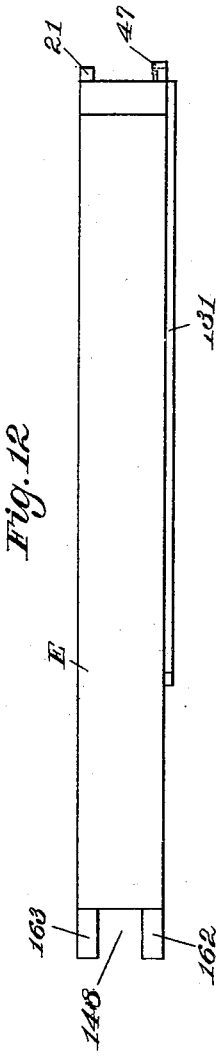
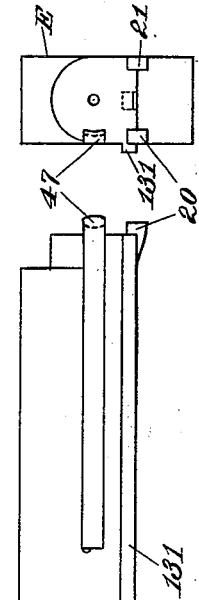
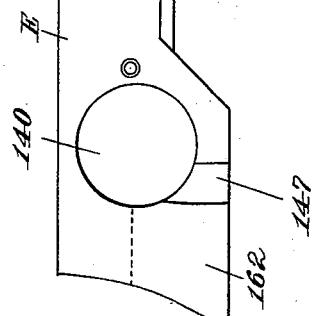
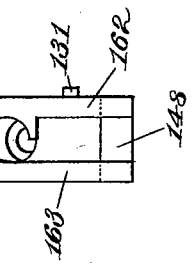
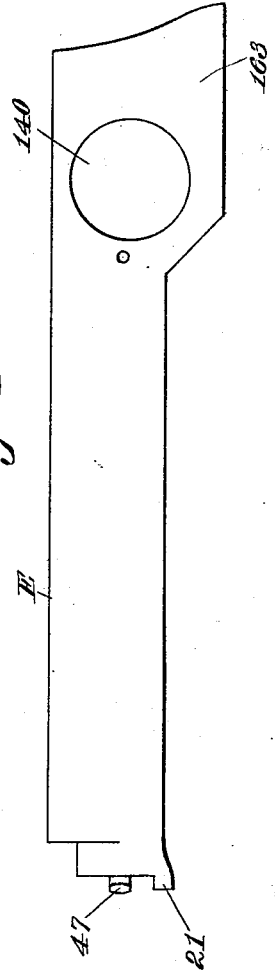
Witnesses:
Henry L. Reckard.
H. Mallner.
Inventor:
James P. Lee,
By his Attorney,
F. H. Richards (No Model.)
J. P. LEE.
STRAIGHT PULL BOLT GUN.
No. 506,320.  Patented Oct. 10, 1893.
9 Sheets—Sheet 9.
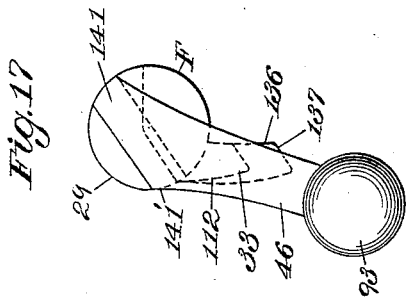
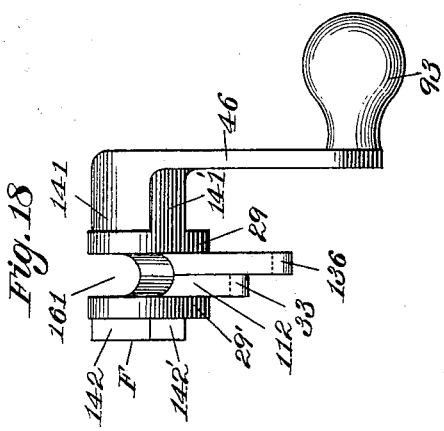
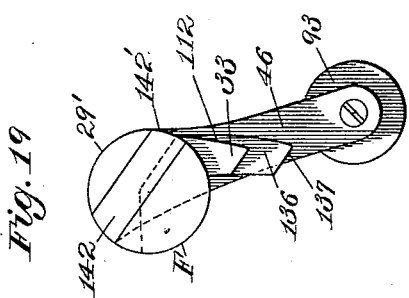
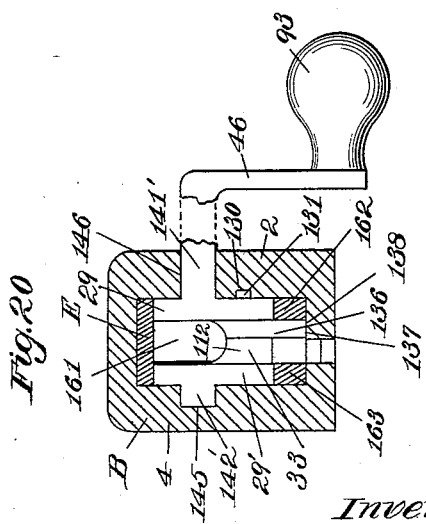
Witnesses:
Henry L. Reckard.
H. Malmer.
Inventor:
James P. Lee,
By his Attorney,
F. H. Richards

UNITED STATES PATENT OFFICE.

JAMES P. LEE, OF ILION, NEW YORK.

STRAIGHT-PULL BOLT-GUN.

SPECIFICATION forming part of Letters Patent No. 506,320, dated October 10, 1893.

Application filed September 22, 1892. Serial No. 446,561. (No model.)

*To all whom it may concern:*

Be it known that I, JAMES P. LEE, a citizen of the United States, and a resident of Ilion, in the county of Herkimer and State of New York, have invented certain new and useful Improvements in Bolt-Guns, of which the following is a specification.

This invention relates to that class of breech-loading fire-arms generally known as "bolt-guns."

The object of my invention is to provide an improved mechanism for breech-loading guns, whereby the sliding bolt may be unlocked, actuated and locked without imparting thereto rotary movements on its longitudinal axis; and also to provide effective means for locking and unlocking the bolt, for preventing the firing of the cartridge prior to the complete closure and locking of the bolt, and for locking the bolt against retraction, whereby the gun will be rapid, effective and safe in action.

In the drawings accompanying and forming a part of this specification, Figure 1 is a plan view of a bolt-gun embodying my present invention. Fig. 2 is a right-hand side elevation of the gun. Fig. 3 is a vertical longitudinal section of the mechanism of the gun, showing the parts in the position when the gun is closed ready for firing. Fig. 4 is a sectional view similar to Fig. 3, showing the trigger drawn back and the firing-pin thrown forward. Fig. 5 is a sectional view similar to Figs. 3 and 4, showing the bolt-actuator thrown upward ready for the withdrawal of the bolt. Fig. 6 is a sectional view similar to Figs. 3, 4 and 5, showing the bolt withdrawn its full stroke, and illustrating also the method of throwing out the empty cartridge. Fig. 7 is a plan view of the receiver. Fig. 8 is a right-hand side elevation of the receiver. Fig. 9 is a left-hand side elevation of the receiver. Fig. 10 is a sectional view of the receiver, in line *b b*, Fig. 7, showing the portion above said line. Fig. 11 is a vertical section of the receiver, showing the portion below said line *b b* in Fig. 7; these two figures being for the purpose of illustrating the internal construction of the receiver and showing the several features thereof which co-act with the bolt mechanism. Fig. 12 is a plan view of the bolt. Fig. 13 is a right-hand elevation of the bolt. Fig. 14 is a left-hand elevation of the bolt. Fig. 15 is a view of the front end of the bolt. Fig. 16 is a view of the rear end of the bolt. Fig. 17 is a right-hand side view of the bolt-actuator. Fig. 18 is a rear elevation of said actuator when in the position shown in Fig. 2. Fig. 19 is a left-hand side elevation of the actuator. Fig. 20 is a vertical cross-sectional view of the receiver and bolt, in line *a a* of Fig. 5.

Similar characters designate like parts in all the figures.

The receiver, designated in a general way by B, is adapted to carry a sliding bolt, and has recoil-abutments for sustaining the bolt when this is closed, (and through its actuator or locker,) against retraction. In its preferred form herein shown, the receiver, or gun-frame, consists of an open frame having the two side walls 2 and 4, joined at their front and rearward ends and constructed to carry the barrel C and for attachment to the stock, D, of the gun; and to receive within it the bolt mechanism. At its front end, the receiver has the bore 3, Figs. 3, 10 and 11, for receiving the threaded end, 5, of the barrel C.

A mortise, 6, Figs. 6, 7, 10 and 11, is formed for receiving the upper end of the magazine M (Figs. 4 and 6) and through which to load the magazine, and also to load the gun when using this as a single-loader; the gun may be used as a single-loader at any time when the magazine is emptied of cartridges.

On the inner side of the right-hand wall, 2, of the receiver B is formed a groove, 130, in which runs the rib, 131, of the bolt, and which serves as a guide to prevent vertical movement of the bolt when this is drawn back to its open position shown in Fig. 6.

Two grooves, 133 and 134, respectively, are formed in the receiver as indicated by dotted lines in Figs. 10 and 11, to permit of the free passage of the projections, 20 and 21, of the bolt when this is removed from the gun; these projections being for the purpose of driving forward the cartridges and also for supporting the cartridge-shell while being withdrawn from the gun-barrel as more fully set forth and claimed in my application, Serial No. 443,481, filed August 19, 1892.

The bolt E is bored longitudinally thereof to receive the firing-pin 25, and at the rearward end thereof is downwardly slotted for the depending arm 26 of said firing-pin, which arm has on the forward side of its lower end a catch, 27, for a purpose hereinafter more fully set forth. A pin, 135, in the bolt serves to support the abutment-sleeve, 31, for the firing-spring 32. Near its rearward end, and intersecting the bore for the firing-pin, the bolt has formed therein the transverse bore 140 to receive the bolt-actuator.

The swinging member, F, of the bolt mechanism I generally designate as the "bolt-actuator," since it is through and by means of this member, or gun-element, when the same is locked in its rearward position shown in Fig. 6, that the bolt is advanced and retracted. One of the principal functions, however, of said actuator is the locking of the bolt in its closed position by engaging the receiver, or frame, B, of the gun; and hence said element F is sometimes designated as the "bolt-locker." For this latter purpose (as well as for retracting the firing-pin) the bolt-locker is made shiftable by a pivotal, or swinging, movement, from one position to another relatively to the bolt, the forward position being shown in Figs. 1, 2, 3, and 4, while the opposite, or rearward, position is shown in Figs. 5 and 6. Said shiftable movement is, by means of the organization and arrangement of the parts described, brought into a plane parallel, substantially, with the bolt-movement, so that the bolt-locker and the bolt itself are both actuated by a single continuous movement of the handle-arm of said locker; this arm being, for that purpose, located at the side of the receiver, and arranged to extend, when the locker is closed, somewhat below the line of the bolt. Another function of the actuator F, besides holding the bolt E in its closed position, is to prevent the full forward movement of the firing-pin until after the bolt has been carried forward and safely locked in place.

The bolt-actuator is journaled in the rearward end of the bolt E, with its axis crosswise of the line of movement of said bolt, and adapted to be turned by means of its handle from the locked position shown in Figs. 2, 3 and 4 to the open, or unlocked, position shown in Figs. 5 and 6. The working portion of said bolt-actuator is of the general form of a cylinder, as will be understood by comparison of the figures of drawings, Figs. 17 to 20, inclusive. The end portions of the cylindrical part of the actuator constitute the journals on which the actuator turns within the bore, or bearing, 140 (Figs. 13 and 14) of the bolt E, said journal surfaces being designated by 29—29', respectively. Intermediate to its said journals, the actuator F is shown provided with an arm, 136, whose end face, 137, is fitted to bear, during a certain portion of the forward movement of the bolt, upon the surface 138 of the receiver B. Adjacent to said arm 136, the actuator is also provided with a catch, 33, whereby to lock the actuator in its open position, as in Figs. 5 and 6, during the greater part of the longitudinal movement of the bolt mechanism; this feature is hereinafter more fully described.

As a means for locking the bolt E in its closed position shown in Figs. 1, 2, 3, 4 and 5, the actuator F is provided at each end of the cylindrical portion thereof with the projecting abutment-plates 141 and 142, respectively, whose rear edges, 141' and 142', are adapted to engage (when the bolt is in its forward position and the actuator is turned from its position shown—partially by solid and partially by dotted lines—in Fig. 5, down to its position shown in Figs. 1 to 4, inclusive) with the corresponding receiver-abutments 22 and 22'. (See Figs. 2, 8, 10 and 11.) Said receiver-abutment faces 22—22' are at the rearward side of the openings 143 and 144, respectively, which are formed in the receiver-walls. The opening, 144, formed in the left-hand wall 4, is made to extend only partially through the thickness of the wall, and is shaped to permit of the required rotatory movement of the actuator-abutment plate 142 within said opening. For permitting the withdrawal of said abutment-plate 142 from the receiver on the retraction of the bolt, a groove, or channel, 145, communicates with said space, or opening, 144, as will be understood from Figs. 10 and 20. A corresponding opening, or channel, 146, is cut entirely through the right-hand wall, 2, of the receiver, (see Figs. 2, 11 and 20,) for the passage of the abutment-plate 141, to the outer end of which is connected, as well shown in the drawings, the actuator-arm 46. Similarly, the opening 143 in the said right-hand wall 2 extends entirely through the said right-hand wall; this is for the purpose of permitting the passage through it of the outwardly-projecting right-hand abutment-plate, 141, of said actuator, as will be understood from Figs. 1, 2 and 20.

An inspection of the several figures of the drawings showing the relation of the abutment plates 141 and 142 to the openings and slots 143—144 and 145—146, respectively, in the receiver B, will show that the upper and lower surfaces of said plates, by sliding in said slots 145 and 146, would operate to prevent the rotation of the actuator F during the latter part of the forward movement of the bolt and until the actuator and plates are carried so far forward as to permit said abutment-plates to be turned into engagement with the abutment-faces 22—22'; but owing to the short radius of the abutment-plates and the comparatively long radius of the handle 93, the pressure upon the sides of said slots by reason of the forward thrust on the handle-arm would cause so much friction as to seriously interfere with the working of the gun. It is for this reason largely that the arm 136 is constructed to bear upon the receiver-face 138 during the forward movement of the bolt after the actuator has been unlocked therefrom; and by reason of the comparatively long radius of said guide-arm 136, and also by reason of the position of said arm and its supporting face 138 relatively to the other parts of the bolt mechanism, any binding or cramping of the parts during the aforesaid period is entirely prevented.

As a means for assembling the bolt E and its actuator, said bolt has formed in one side thereof the channel, or passage-way, 147 (Figs. 6 and 13), through which, when sliding the cylindrical portion of the actuator into the cylindrical opening 140 in the bolt, the arm 136 of said actuator may pass until it comes into alignment with the slot 148, Figs. 3, 4, 5, 16 and 20, in which said arm is adapted to swing.

As shown in Fig. 2, the lower line 160 of the receiver-slot 146 is made to coincide nearly with the center, or axis, of the actuator-cylinder; and the abutment-plates 141 and 142 of said actuator are correspondingly located, nearly or quite the whole thickness thereof, above said actuator-axis. By this means the abutting faces 22 and 22', respectively, of the receiver, are brought so far upward relatively to the bolt that the force of the recoil transmitted thereto through said actuator does not greatly tend to raise the bolt in the receiver, or gun-frame.

For the purpose of providing space for the firing-pin, a notch, or passage-way, 161, is formed in the upper side of the actuator, through which the stem, 25, of said pin passes, as will be understood by comparison of these features in the several figures of the drawings.

The actuator F is prevented, when the bolt is withdrawn as in Fig. 6, from movement longitudinally of its axis by the side-walls 162 and 163 at the rearward end of the bolt E, between which walls swings the aforesaid arm 136 of the actuator. When the bolt is in its forward position, the end portions of the cylindrical part of the actuator, above and below the abutment-plates thereof, project so far above and below the opening 146 in the right-hand receiver-wall 2 as to securely hold the actuator in its proper position.

To disassemble the actuator and bolt, the bolt mechanism is withdrawn from the gun, (which may be done by removal of the stop-pin or screw 132,) the firing-pin is removed by first driving out the pin 135, thereby removing also the locking-arm 26 and leaving the actuator free to be swung to bring its arm 136 to the aforesaid opening 147 shown in the right-hand side of the bolt E, in which position (corresponding to that in Figs. 3 and 4) the actuator is free to be withdrawn from the bolt by sliding it outward toward the right-hand from the cylindrical opening 140 in the said bolt.

The actuator F is furnished, as above stated, with a depending arm, 33, the rearward side, 112, of which serves, on the retractive movement of the bolt-actuator, to draw back the firing-pin from the position shown in Fig. 4 to that shown in Fig. 5; on the extreme retraction of the actuator, said arm passes over and engages upon the aforesaid actuator-locker-catch 27 of the firing-pin-arm, so as to lock the actuator in its retracted position shown in Fig. 5. Said several parts of the "bolt-mechanism" being thus positioned and locked together, may then be drawn back as one member of the gun-mechanism, as illustrated in Fig. 6, and afterward pushed forward again, at which time the firing-pin-arm 26 engages the rearward end 38 of the sear 39, and is thereby held retracted during the remaining forward movement of the bolt-mechanism to the position thereof shown in Fig. 3. This latter forward movement carries the bolt-actuator arm 33 forward of said firing-pin catch 27, and thus releases the actuator, which may now be turned forward to close and lock the bolt. The actuator safety-arm, 136, is for preventing the turning forward of said actuator (after the unlocking of the actuator-arm 33 from the firing-pin-arm catch 27), until the bolt has been pushed fully forward. During the latter part of the forward movement of the bolt from its position in Fig. 6 to its position in Fig. 3, the lower end or face, 137, of said safety-arm 136 slides on the face 138 of the receiver, thus preventing the turning down of the actuator until the bolt has been pushed fully forward; at which time said arm may pass downward into the slot or opening, 139, formed therefor in the receiver, (see Fig. 11,) thus permitting of the forcible uncatching of the arm 33 from the catch 27.

The projections 20—21, at the forward end and lower part of the bolt, serve to support the cartridge-head from falling during the retraction of the cartridge by the engagement of the retractor-hook 47 with the rim thereof. See Figs. 12 to 15. Said projections, when the bolt is locked in its forward position, enter corresponding recesses formed in the rearward end of the barrel. On the barrel, between said recesses, is a projection having a concaved face, 50, suitably inclined for receiving the forward end of the cartridge when this is driven forward by the bolt, and thereby guiding said cartridge upward into the rear of the barrel. At the right-hand inner side of the barrel, a suitable notch should be formed to receive the projecting forward end, or hook, 47, of the extractor.

In Figs. 1 and 2, a short portion of the rearward part, 52, of the tip 53 of the gun-stock is shown. On the end of this tip is usually placed the escutcheon-plate 54, which forms a guide for the insertion of the magazine, and whose rearward ends fit into corresponding notches in the forward face of the guard-block 59. Through the forward end of said escutcheon passes a screw, 60, which extends through said tip 53 and screws into the forward end of the receiver, as shown in Fig. 3.

The breech-piece, 61, of the stock is shown fitted to the under side of the receiver and between the receiver and the strap 62 of the guard-block; the forward end of the breech-piece being fitted within the side-walls, 63 and 64, of said block. A screw, 65, passes through the rearward end of the receiver, through the stock, and screws into the rearward end of said strap 62, as will be understood from comparison of the figures of the drawings in which said parts are shown.

The guard-block is centrally mortised at the forward end thereof to receive the magazine-catch 66, which is pivoted at 67, and carries at its upper end, by a pivot, 68, the ejector-arm 69; which arm is set into a slot formed in the upper end of said magazine-catch, and has an actuating-arm, 71, which reaches upward into the groove, 72, formed in the under side of the bolt E. Said groove, at its forward end, is shaped at 73 to form a cam, which on the retraction of the bolt strikes said arm 71 of the ejector and throws this downward into the position shown in Fig. 6, thereby ejecting the shell upward through the mortise, 6, of the receiver. The magazine-catch 66 is pivotally supported, or journaled on projections set in corresponding sockets, or pivot-bearings, formed in the upper side of the guard-block, and is thereby securely retained in place when the gun is assembled. The catch-lever 66, designated in a general way as the magazine-catch aforesaid, has on the forward side thereof a catch, or hook, 78, for engaging with the magazine when this is inserted into its receiving-chamber. The lower end of said catch-lever 66 is extended downwardly and rearwardly to project a short distance within the space, 79, within the trigger-guard 80, which guard joins at its front end the front portion of the guard-block, and at its rearward end joins the strap, 62, thereof, the guard being generally and preferably made integral with the other portions of the guard-block.

The mortise, 81, of the guard-block is extended backward into the strap, 62, thereof to receive the trigger 82, which is pivoted at 83, and whose upper end, 84, connects with the arm 85 of the sear 39, which is pivoted at 86 in ears, as 88, formed on the guard-block. The stop 89 on the sear limits the upward movement of the sear by striking against the face 90 of the guard-block. The rearward end, 38, of the sear is shaped to engage the lower end, 27, of the firing-pin-arm 26 when this is moved forward during the closing movement of the bolt.

For retracting the sear, the sear-spring 94 is inserted thereunder, having its end 95 working in a notch, 96, formed in the sear-arm 85, as shown. Said spring also is shown having its opposite end seated in a notch, 97, in the rearward side of the magazine-catch, so that the one spring actuates both the sear and the magazine-catch. The forward end, 98, of said spring is broadened so as to stand immediately under the flanges, 88—88, in which the sear is pivoted, for the purpose of normally preventing any upward movement of the magazine-catch out of its bearing-sockets.

The magazine, designated in a general way by M, shown in the drawings is supposed to be the same magazine as shown and described in my application, Serial No. 447,539, filed October 1, 1892. It will be understood, however, that the construction of the magazine is not a feature of my present invention, and that I may substitute for the form of magazine shown any other well-known form of cartridge-magazine. When using the preferred form of magazine shown in the drawings, this is shaped to set within the chamber, 99, of the stock-tip 53 and to enter immediately within the mortise, 6, of the receiver, being held in place by the hereinbefore-described magazine-catch 78 engaging a catch, 100, formed on the rearward end of the magazine.

To remove the magazine from the gun, it is only necessary to draw back the catch 66 and draw the magazine down out of said chamber. Of course, the magazine used should have therein, or in connection therewith, suitable cartridge-elevating means for bringing the cartridges up into position forward of the bolt, where this can engage the heads thereof for driving them forward into the chamber of the gun-barrel.

As a means for connecting the guard-block to the receiver, said block has formed thereon hooks, as 101, which engage in corresponding under-cut notches, as 103, formed in the receiver. The screw 65, by connecting the end of the guard-arm with the receiver, holds the guard-block in locking engagement with the receiver.

The particular manner of constructing the guard-block for locking engagement with the receiver may be varied from that shown in the drawings.

The lower side of the guide-face 50 of the barrel coincides with the upper edge of the similar guide-face 105 of the receiver; so that said two guide-faces together form a guide-way for guiding the point of the cartridge and elevating the same, during the early part of its forward movement. Said inclined guide-way co-acts with the bolt of the gun when this strikes the head of the cartridge, to guide and elevate the point of the cartridge into position for entering the chamber of the gun.

Several elements or features of the gun-mechanism herein shown and described, to wit: the stock D, the guard-block 59 and the means for holding the same in place, the barrel C, the trigger 82, the sear and its actuating-spring, the space for receiving the magazine and the catch for holding the magazine in place, the means for supporting and actuating said catch, and the ejector 69 and its cam, are or may be the same as shown, or described and claimed in my prior application, Serial No. 443,481, filed August 19, 1892.

The general operation of the fire-arm is as follows: The gun having been fired, and the bolt remaining closed as in Fig. 4, the gunner, seizing the handle, 93, of the bolt-actuator, draws directly backward thereon to retract the bolt-mechanism throughout its full stroke to the position shown in Fig. 6. The first movement of the actuator F is to turn itself from its position in Fig. 4 to its position in Fig. 5. This movement of said actuator carries the actuator-arm 33 backward against the firing-pin-arm 26, and retracts the firing-pin to its position shown in Fig. 5, engaging the catch 27 of said firing-pin-arm over the end of the actuator-arm, and thereby locking the actuator firmly in its retracted position. This position of the bolt-mechanism having been reached, the further drawing back upon the actuator-handle 93 slides the bolt backward to its retracted position shown in Fig. 6. Just previous to reaching its fully retracted position, the ejector-cam 73 on the under side of the bolt strikes the arm 71 of the ejector and forcibly throws this downward, and the ejector-arm 69 upward, thereby ejecting the shell upward through the mortise, 6, of the receiver, as hereinbefore more fully set forth. The shell having been ejected and another cartridge brought up by the magazine to the position shown in Fig. 6, forward of the bolt, the operator then pushes forward the bolt by a steady pressure upon the actuator lever 46. The first forward movement of the bolt drives the cartridge forward, with its point against the guide-way 105, which lifts the cartridge-point upward to the gun-chamber, so that during the remaining forward movement of the bolt the cartridge is slid into place in said chamber. The bolt having gone forward the major part of its movement, the lower end of the firing-pin-arm 26 engages the sear and is thereby held retracted during the remaining forward movement of the bolt-mechanism. At the same time the face 137 of the safety-arm 136 slides on the safety-face or lever-bearing 138 of the receiver, thereby preventing any rotary shifting movement of the actuator until the bolt has gone fully forward; at which time the arm 136 will have passed off the said face 138 of the receiver, and the actuator may be turned on its journals to lock the bolt, the arm 136 swinging down into the slot, 139, formed in the receiver therefor. This construction and organization of the parts insures the releasing of the actuator-arm from the firing-pin-catch prior to the beginning of the forward rotary movement of the actuator. The gun now being loaded and locked ready for firing, the gunner has only to take aim and, when ready to fire, pull the trigger; this, through the connections described, retracts the sear from its engagement with the firing-pin, which is then thrown forward by the main-spring 32 to strike with its point 107 the cap of the cartridge and thus fire the same. The gun having been fired, is then ready for a repetition of the loading operation, which is again performed as hereinbefore described.

That element of the bolt-mechanism which I have designated as the firing-pin not only constitutes a pin for firing the cartridge, but the rearward portion thereof also serves as a spring-actuated bolt-actuator-locker. Considering said element only as an actuator-locker operating for the purpose specified, it consists, in the preferred form thereof herein shown, of the rod 25 provided with an arm, 26, and having a hook, or catch, 27, engaging the actuator for locking the same in its retracted position; the object of this arrangement being to temporarily and securely lock the actuator against any shifting movement relatively to the bolt during the operation of withdrawing and sliding forward the bolt-mechanism. By this means the handle of the shiftable actuator F is made to serve as a handle for operating the bolt as set forth, and operates both parts by a single continuous stroke; also, the actuator is thereby prevented from having any premature shifting movement relatively to the bolt.

The element which I have designated by 39, and which, in the form thereof herein shown, constitutes the sear for operating the firing-pin, serves, independently of its connection with the firing of the cartridge, as a bolt-actuator-locker retractor, for detaching the actuator-locker-catch 27 from the bolt-actuator-arm 33 during the closing period of the forward movement of the bolt. By this means, as elsewhere herein set forth, the bolt-actuator F is unlocked from the bolt at the proper time for engaging with the recoil-abutments, 22 and 22', of the receiver.

By the term "sliding bolt," as used herein, is meant the longitudinally-reciprocating bolt arranged rearwardly of the gun-barrel for opening and closing the same, said bolt being drawn back by a longitudinal movement thereof for opening the barrel and extracting the cartridge, and carried forward by a reverse longitudinal movement thereof to drive the cartridge into the barrel and close the bore thereof.

By supporting the bolt-locker, or bolt-actuator, on the bolt in the manner set forth, and extending the handle-arm thereof downwardly by the side of the stock of the gun, the handle is brought into a position which enables the soldier to operate the bolt-mechanism without taking the gun from the shoulder, thus reducing by two the number of "movements" which would otherwise be required for operating the fire-arm. By means of my present invention, therefore, I accomplish an important object in simplifying the management of the piece, the entire operation of the breech-loading mechanism being effected by continuous strokes of the handle forwardly and backwardly alongside of the gun-stock.

Certain features of the bolt-mechanism of the gun herein shown and described, relating to the means for locking the bolt-actuator in its open position, being of my invention constitute in part the subject-matter of a separate application, Serial No. 446,862, filed September 26, 1892.

Those features of the invention herein shown and described but not claimed herein (being of my invention and not pertaining to the particular construction and arrangement of the actuator F in connection with the bolt E, nor to the means for locking the bolt-actuator in its open position,) constitute in part the subject-matter of a prior application, Serial No. 443,481, filed August 19, 1892, to which reference may be had.

Those features of the improved breech-loading gun herein shown and described which reside in the particular construction and arrangement of the actuator F and the peculiar combination thereof with the bolt E, are not of my invention.

Having thus described my invention, I claim—

1. In a bolt-gun, a bolt-locking and actuating-mechanism comprising a receiver having side-walls with recesses formed therein radially-disposed with relation to a common center to form locking abutments, a bolt fitting said receiver and capable of sliding between the walls thereof and having a horizontally transverse journal-bearing formed therethrough, a bolt-locking-actuator journaled in said bearing and having bearing-plates radially-disposed with relation to the axis of the actuator-journal and capable of engagement with said abutments of the receiver, and means to turn the actuator to throw the bearing-plates into and out of engagement with the abutments of the receiver, to lock and unlock the bolt with relation to the receiver, substantially as described.

2. In a bolt-gun, the combination with the receiver having the radially-disposed abutments in its side-walls and having the guiding-face 138 and the longitudinal slots or channel in communication with the recesses which form the abutments, of the sliding-bolt contained between the walls of said receiver and having the transverse journal-bearing, the bolt-locker-actuator journaled in said bearing and having bearing-plates to engage the abutments of the receiver and having the arm 136 to engage the bearing-face 138 of the receiver for preventing frictional-impingement between the bearing-plates in the channel of the side-walls during the forward movement of the bolt, and for preventing rotation of the actuator until the axes of the bearing-plates and receiver-abutment coincide, and means for operating said actuator, substantially as described.

3. In a bolt-gun, the combination with a receiver adapted to carry the sliding bolt and having a recoil-abutment and a lever-bearing, of a bolt fitted to slide in the receiver and adapted to carry the swinging bolt-locking actuator, the bolt-actuator pivotally supported on the bolt, and arranged to swing in the direction of the bolt-movement, and having a guide-arm adapted to bear on said lever-bearing during the latter part of the forward movement of the bolt, and means for locking the actuator in its open position before the retraction of the bolt and for unlocking the same during the forward movement of the bolt, substantially as described.

4. In a bolt-gun, the combination with the receiver having the recesses 143, 144, in its side-walls to form abutments radially-disposed with relation to the center of said recess, and having the bearing-face 138 and the channels 145, 146, substantially in horizontal alignment with the longitudinal axis of the bolt and communicating with said recesses, of the bolt fitted to slide between the walls of said receiver and having a horizontally transverse journal-bearing whose axis is co-incident to the axis or center of the abutment recesses when the bolt is in its extreme forward position, a bolt-actuator journaled in said bearing and having bearing-plates to engage the abutment-faces 21', 22, of said recesses when it is desired to lock the bolt in its forward position and adapted to slide in the channels 145, 146, as described, the firing-pin supported in the bolt and having the depending-arm with the catch at its end; the depending-arm 33 of the actuator to engage the catch of the firing-pin, the arm 136 of said actuator adapted to engage the bearing-face 138 of the receiver to limit the movement of the actuator during the forward movement of the bolt, and a handle or arm to turn said actuator to lock and unlock the bolt with relation to the receiver, substantially as described.

5. In a bolt-gun, the combination with the receiver adapted to carry the sliding bolt and having a recoil-abutment and a lever-bearing, of a bolt fitted to slide in the receiver and adapted to carry the swinging bolt-locking actuator, a bolt locking actuator pivotally supported on the bolt and arranged to swing in the direction of the bolt-movement, and (when the bolt is in its forward position) to turn into engagement with the recoil-abutment, the firing-pin substantially as described carried by the bolt and having an actuator-locking catch, and a firing-pin-retracting lever-arm on said actuator constructed to retract the firing-pin on the unlocking of the bolt and to engage said firing-pin-arm catch for locking the actuator in its open position during the retraction of the bolt, substantially as described.

6. In a bolt-gun, the combination with a receiver adapted to carry a sliding bolt and having a recoil-abutment, of the bolt fitted to slide in the receiver and to carry a bolt-locking actuator, a firing-pin substantially as described carried by the bolt and adapted to have longitudinal movements therein, a bolt-locking actuator movably supported on the bolt and adapted to engage the receiver recoil-abutment when the bolt is in its forward position, and a firing-pin stop-arm carried by said actuator into the path of the firing-pin during the unlocking of the bolt, whereby the firing of the gun is prevented when the bolt is not fully closed and locked, substantially as described.

7. In a bolt-gun, the combination with a receiver adapted to carry a sliding bolt and having a recoil-abutment, of a bolt fitted to slide in the receiver and adapted to carry a bolt-locking actuator, a firing-pin substantially as described carried by the bolt and adapted to have longitudinal movements therein, and a bolt-locking actuator movably supported on the bolt and adapted to engage said recoil-abutment when the bolt is closed, and constructed to extend into the path of the firing-pin during the first retractive movement of the actuator, whereby the firing of the gun is prevented when the actuator is not fully engaged with the recoil-abutment, substantially as described.

JAMES P. LEE.

Witnesses:
FRANCIS H. RICHARDS,
HENRY L. RECKARD.